(12) United States Patent
Cato

(10) Patent No.: US 6,412,111 B1
(45) Date of Patent: Jun. 25, 2002

(54) DATA PROCESSING SYSTEM AND METHOD FOR IMPLEMENTING PROGRAMMABLE DISTRIBUTION OF INFORMATION BY A VIDEO SERVER

(75) Inventor: Robert T. Cato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/947,951

(22) Filed: Oct. 9, 1997

(51) Int. Cl.$^7$ .......................... H04N 7/16; H04N 11/00; H04N 7/08; H04N 5/445
(52) U.S. Cl. .......................... 725/137; 725/58; 725/61; 725/136; 725/141; 725/153; 348/468
(58) Field of Search ................ 725/58, 61, 136, 725/137, 141, 153; 348/468

(56) References Cited

U.S. PATENT DOCUMENTS

| | | | |
|---|---|---|---|
| 4,821,102 A | | 4/1989 | Ichikawa et al. |
| 4,908,707 A | | 3/1990 | Kinghorn |
| 5,185,665 A | | 2/1993 | Okura et al. |
| 5,410,367 A | | 4/1995 | Zahavi et al. |
| 5,532,754 A | * | 7/1996 | Young et al. .................. 725/47 |
| 5,541,738 A | | 7/1996 | Mankovitz |
| 5,552,833 A | | 9/1996 | Henmi et al. |
| 5,568,179 A | | 10/1996 | Diehl et al. |
| 5,583,560 A | * | 12/1996 | Florin et al. .................. 725/40 |
| 5,592,551 A | | 1/1997 | Lett et al. |
| 5,619,249 A | | 4/1997 | Billock et al. |
| 5,699,107 A | * | 12/1997 | Lawler et al. ................. 725/58 |
| 5,778,181 A | * | 7/1998 | Hidary et al. ................ 725/110 |
| 5,880,768 A | * | 3/1999 | Lemmons et al. ............. 725/41 |
| 5,929,849 A | * | 7/1999 | Kikinis ........................ 725/113 |
| 5,987,509 A | * | 11/1999 | Portuesi ....................... 725/113 |
| 6,075,527 A | * | 6/2000 | Ichihashi et al. ........... 345/327 |

* cited by examiner

*Primary Examiner*—Andrew Faile
*Assistant Examiner*—Andrew Koenig
(74) *Attorney, Agent, or Firm*—John B. Schelkopf; Richard F. Frankeny

(57) ABSTRACT

A video source provides information to a communication device that results in an icon being displayed on the communications device during a preview of a television program or segment of a television program. The icon indicates to the user that a single button on a remote control or other user-controller device can be used to program the communication device, including television, video-cassette recorders, cable boxes, network computers, or the like, to display or record the desired program or program segment as the program segment is being televised or communicated. Specifically, during operation, the exact date, time, and source of the actual television program or program segment is encoded in an unused portion of a teletext data stream when the icon is present. If the communication device receives an appropriate command from its user-controlled device while the icon is displayed, a central processing unit within that communication device, saves the information together with a channel presently being viewed. The communication device may include an alarm clock type function such as that typically used by video-cassette recorders. When the actual date and time match that of the desired segment, the communication device will tune itself to the desired channel or video source. The video-cassette recorder may begin a recording in one embodiment of the present invention. Alternatively, the television, video cassette recorder, cable set top box, or other form of communication device may notify the viewer that a desired segment is about to start and the viewer may elect to change channels to view that segment.

30 Claims, 6 Drawing Sheets

DATA PROCESSING SYSTEM AND METHOD FOR IMPLEMENTING PROGRAMMABLE DISTRIBUTION OF INFORMATION BY A VIDEO SERVER

TECHNICAL FIELD

The present invention relates in general to a video server, and more particularly, to a method for programming a video client, such as a television, video cassette recorder, cable box, a personal computer, or a network computer, for distribution by a video server.

BACKGROUND INFORMATION

In recent years, video server and distribution systems have been implemented to allow television viewers to view certain movies on demand. In addition to viewing movies on demand, video servers have been implemented to allow for personal television viewing scheduling. In one embodiment of a personal television scheduler system developed by International Business Machines Corporation (IBM), a simple and unique way of specifying a customized viewing schedule is implemented for television viewers. The interface implemented by IBM animates already familiar television schedule presentation formats, while adding additional capabilities. Specifically, the personal television scheduler system implements a television program listing format that is interactive. When any program listing within the listing format is activated (through a mouse click, highlighting through a remote control, and the like) either more information about the television program may be obtained or the program may be selected for viewing. A personal television watch bar comprises a bar listing the customized scheduler of the viewer. This schedule is built from the available listings and maintains the same format as the television listing guide. Furthermore, in one embodiment, the IBM system implements scroll bars and day change indicators from which the watch list is to be created in a format familiar to most computer users.

When a viewer tunes to a television station that is interactive with the personal television scheduler system, a menu that displays all the programs will be shown to the viewer during operation of the personal television scheduler system developed by IBM. Programs and applications, such as video-on-demand, home shopping, and games are just some of the examples of programs and applications that may be displayed in the menu. Furthermore, the personal television scheduler system described above is one of these applications. When a viewer selects the personal television scheduler application, a menu listing television programs for a specific day will be displayed on a television screen. In one embodiment of the IBM application, the screen is divided into two portions. The upper portion of the screen includes a watch bar that allows the viewer to move the selected programs into certain time slots. The lower part of this screen displays all the programs supported by the service provider. The viewer may then scroll up or down for that day's program by clicking the up or down arrow icon in one embodiment of the present invention.

In this implementation of the personal TV scheduler application, a viewer can move a cursor to a program they are interested in and click a remote control button to obtain more details about that television program. Furthermore, to establish their own schedule, a viewer may move the cursor to the programs they want to watch and click the button twice to highlight the selected program. The viewer may then select one program or multiple programs from either a single network or multiple networks. Additionally, the viewer may select a combination of broadcast programs and interactive television programs. Based on the selection of television programs, the viewer may then copy these programs into available time slots on the upper part of the television screen. Once the programs are selected and copied, the viewer may save the programs in an appropriate manner. The saved program format will then be forwarded to the service provider for approval of scheduling. Additionally, the viewer may obtain details about the selected programs.

In the personal television scheduler described above, past, current and future broadcast material may be accessed. In some embodiments, the personal television interface may present program selections to the television viewer from the past days as well as upcoming broadcast material for inclusion in a customized schedule. In an alternate embodiment, the personal television scheduler replaces the programming facilities of a video-cassette recorder within a television viewer's home. The program information for the personal television scheduler is sent from a cable TV head-end and is captured by the video-cassette recorder. Since the video-cassette recorder cannot access past material, unless the television is able to access past material, the personal television scheduler interface only allows the selection of future programs for recording and effectively replaces the programming facilities of the video-cassette recorder. The program information for the personal television scheduler is sent from the cable TV head-end and is captured by the video-cassette recorder. Since the video-cassette recorder cannot access past material, the personal television scheduler interface only allows the selection of future programs for recording. Thus, for example, the personal television scheduler does not allow an 11:00 broadcast of a program to be viewed at 10:00, but will allow the program's viewing at 12:00. For additional information regarding the personal television scheduler implemented by IBM, refer to *IBM Technical Disclosure Bulletin*, Volume 39, No. 8, published in August 1996, which is hereby incorporated by reference herein.

In addition to the personal television scheduler implemented by IBM, some programming systems utilize teletext information to program a video-cassette recorder in a similar manner. Teletext refers to a transmission protocol that allows characters and graphic information, such as news, weather forecast, stock market information, and translations of the words being spoken on a program, to be presented on a screen of a television or other display device. It should be noted that televisions have typically been developed with a built-in receiver for receiving teletext in a coded transmission system. Additionally, it should be noted that the teletext protocol is used to transmit television-program table information such as channel information, date information, time information, program code information, and title information, as well as other data typically transferred using the teletext protocols.

The programming source encodes character and graphic information into the teletext portion of the transmitted signal in accordance with the teletext protocol that has been defined by the television transmission industry. Subsequently, a television receiver with a teletext decoder decodes the character and graphic information to offer the services, such as news and weather forecast, that are displayed on the television or another display device. Additionally, to make teletext transmissions further widespread, television-program table information (including program title, program broadcasting date, programming broadcasting time, and the like) are encoded, transmitted as data by expanding transmission capabilities while compatibility with the conventional teletext protocol is maintained. This compatibility allows the teletext protocol to be utilized for video recording reservation by image recording/reproducing apparatus such as video tape recorders. An apparatus which performs such receiving and decoding operations is disclosed in U.S. Pat. No. 5,552,833 by Henmi, et al., which is hereby incorporated by reference herein. An alternate teletext receiver that provides video-cassette recorder programming operations is disclosed in U.S. Pat. No. 4,908,707 by Kinghorn, which is hereby incorporated by reference herein.

Teletext systems provide a great deal of flexibility and functionality for recording programs identified by television program tables. However, many television programs include shorter segments that may be of interest to a television viewer. Current programming techniques do not allow a user to specify that a segment or only a portion of a television program should be recorded or viewed. Thus, television viewers that "surf" television programs such as a television news show often discover an announcer describing or previewing an interesting segment that will be presented after a commercial or after a segment that is currently being aired. Such television viewers have no recourse to determine when the segment desired to be viewed will be actually aired.

Therefore, a need exists for a method and data processing system that allows a television viewer to determine when interesting segments of a television program will be displayed. Also, a need exists for a method for easily programming a television video-cassette recorder for future viewing or recording of a segment or program being described or previewed on the television.

SUMMARY OF THE INVENTION

The previously mentioned needs are fulfilled with the present invention. Accordingly, there is provided, in a first form, a communication system. The communication system includes a programming source for providing a teletext signal and a video signal. The video signal comprises a video portion and a first control portion. A first receiver is connected to the programming source for receiving the video signal. The first receiver decodes the first control portion to provide a first indicator and a second control portion. A communication device is connected to the first receiver for receiving the first indicator and the second control portion. The communication device provides the first indicator to indicate a characteristic of the video signal.

Additionally, there is provided, in a second form, a method for operating a communication system. The method includes the step of providing a video signal from a programming source. The video signal includes a video portion and a first control portion. The first control portion is decoded to provide a first indicator and a second control portion. The first indicator and the second control portion are provided to a communication device. The communication device is enabled to provide the first indicator to indicate a characteristic of the video signal.

Furthermore, there is provided, in a third form, a program storage device readable by a machine, tangibly embodying a program of instructions executable by the machine to perform method steps for operating a communication system. The method steps include providing a video signal from a programming source. The video signal includes a video portion and a first control portion. The first control portion is decoded to provide a first indicator and a second control portion. The first indicator signal is provided to a communication device. The communication device is enabled to provide the first indicator to indicate a characteristic of the video signal.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention implements a communication network that allows viewers to watch and/or record, when desired, a particular future program or program segment in an efficient and simple manner. By providing this methodology for future programs, as well as future program segments within a television program, viewers may view an entire program or merely a designated segment of that program.

To provide that functionality, the present invention implements a video source that places a small, distinctive icon on the viewer's screen during a preview of the segment. This icon is transferred to the viewer's screen via the television signal and may have information associated therewith by data encoded within a corresponding teletext data stream. The icon indicates to the viewer that a single button on the remote control for the television, video-cassette recorder, cable box or other communication device may be engaged while the icon is present to program the television, video-cassette recorder, cable box, or the like, to display or record the desired program or program segment at an appropriate time. Furthermore, when the icon is present, the exact date, time, and source (if it is different than the channel being received) of the actual program segment is encoded in an unused portion of the teletext data stream.

It should be noted that teletext data corresponds to close captioned data. This information is saved when the television, video-cassette recorder, cable box or similar communication device receives an appropriate command from its remote control or another control device.

During operation, the display device which is communicating the information will implement a timer function, such as that typically used by current video-cassette recorders. When the actual date and time match that of the desired segment, the display device will tune itself to the desired channel or video source. Subsequently, with respect to the video-cassette recorder, a recording operation would be initiated. Alternatively, the television, video-cassette recorder, or cable box may notify the viewer that a desired program segment is about to begin and the viewer could elect to change channel to view the desired segment. It should be noted that the notification implemented by the television, video-cassette recorder, cable box and the like may be implemented in a manner that is not disruptive to the video presently being watched through the use of an icon or message at the bottom of the display screen.

In one embodiment of the present invention, multiple programs and segments can be programmed using the methodology generally described above. Furthermore, in addition to including the data, time and source of the desired program or segment, the encoded data could include a description of the program or segment that could be observed by a viewer of the television, video-cassette recorder, cable box or a similar device. Furthermore, that viewer may delete programs and segments from the displayed list, if desired. The foregoing has provided a general description of one embodiment of the present invention. A more detailed description will subsequently be provided below.

During a subsequent description of the implementation of the invention, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Description of Connectivity

Figure 1:
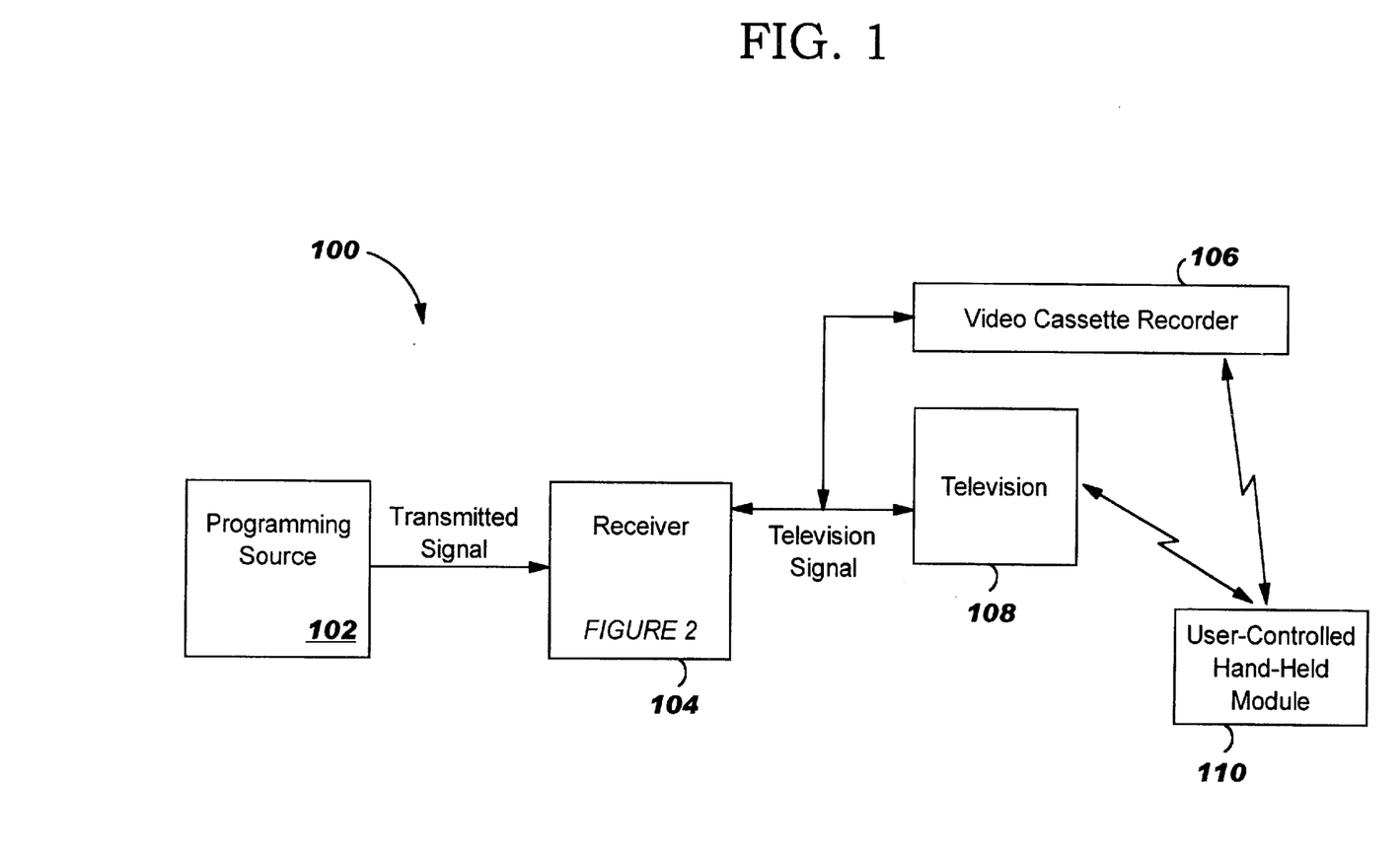
FIG. 1 illustrates, in block diagram form, a communication system in accordance with one embodiment of the present invention.

Refer now to FIG. 1. FIG. 1 illustrates a first embodiment of a communication system 100 comprising a programming source 102, a receiver 104, a video-cassette recorder 106, a television 108, and a user-controlled hand-held module 110. Programming source 102 is coupled to receiver 104 to provide a Transmitted signal. Receiver 104 is coupled to video-cassette recorder 106 and television 108 to provide a Television signal. User-controlled hand-held module 110 is coupled to video-cassette recorder 106 and television 108 to provide a plurality of control signals.

Figure 2:
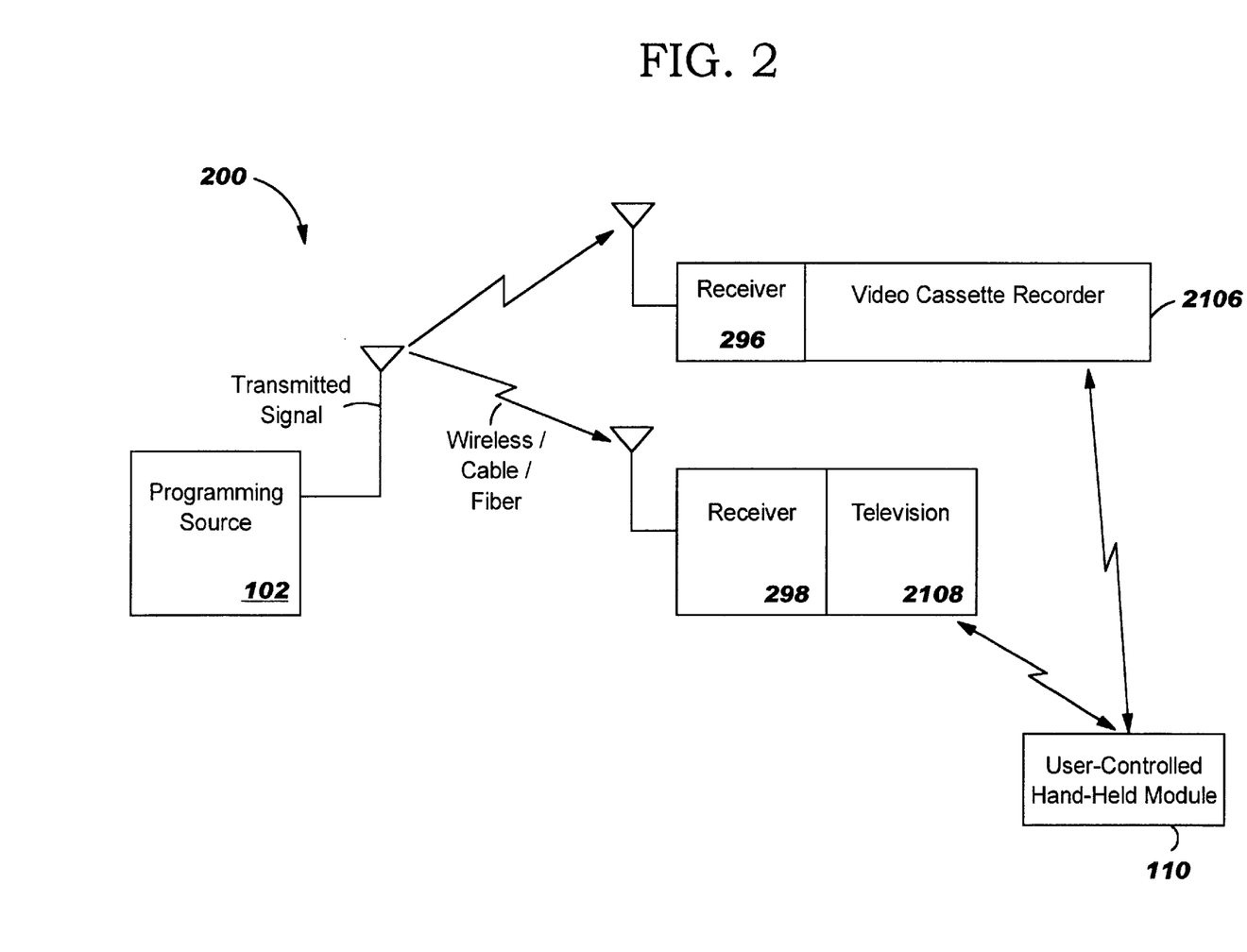
FIG. 2 illustrates, in block diagram form, a communication system in accordance with one embodiment of the present invention.

FIG. 2 illustrates a second embodiment of a communication system 200 comprising a program source 102, a receiver 296, a receiver 298, a video cassette recorder 2106, a television 2108, and a user-controlled hand-held module 110. Programming source 102 is coupled to each of receivers 296 and 298 to provide a Transmitted signal. Receiver 296 is coupled to video cassette recorder 2106 to provide a first Television signal. Similarly, receiver 298 is coupled to television 2108 to provide a second Television signal. User-controlled hand-held module 110 is coupled to each of television 2108 and video cassette recorder 2106 to provide a plurality of control signals.

Figure 3:
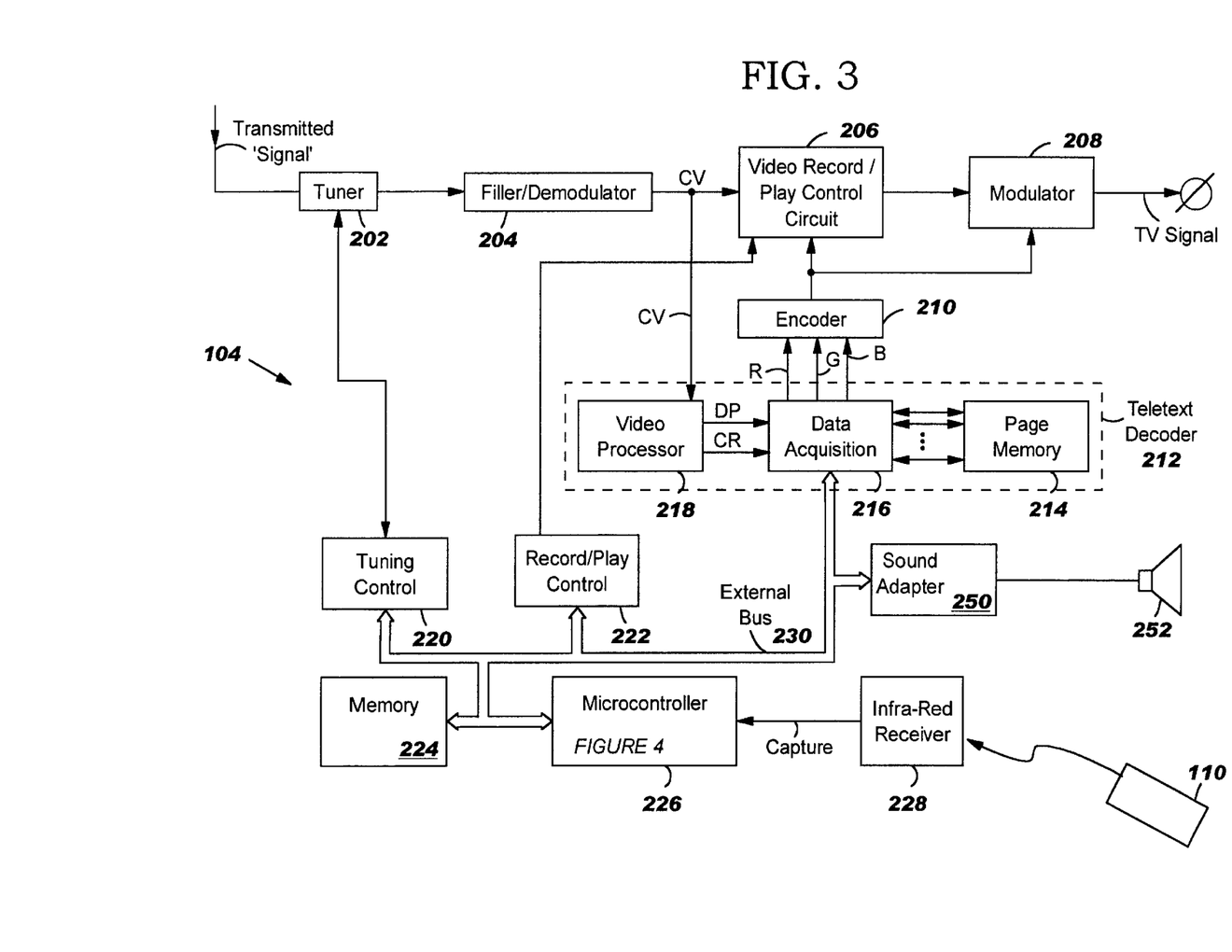
FIG. 3 illustrates, in block diagram form, a receiver implemented in accordance with one embodiment of the present invention.

FIG. 3 illustrates receiver 104 in greater detail. Receiver 104 comprises a tuner 202, a filter/demodulator 204, a video record/play control circuit 206, a modulator 208, an encoder 210, teletext decoder 212, a tuning control circuit 220, a record/play control circuit 222, a memory 224, a microcontroller 226, and an infra-red receiver 228, a sound adapter 250, and an output device 252. Teletext decoder 212 comprises a video processor 218, a data acquisition circuit 216, and a page memory 214.

A transmitted signal is coupled to tuner 202. Tuner 202 is coupled to filter/demodulator 204 and to tuning control circuit 220. Filter/demodulator 204 is coupled to video processor 218 and video control/play control circuit 206. Video record/play circuit 206 is coupled to modulator 208 and encoder 210. Encoder 210 is coupled to modulator 208. Modulator 208 provides a television signal. Infra-red receiver 228 is coupled to microcontroller 226. An external bus 230 is bidirectionally coupled between each of microcontroller 226, memory 224, tuning control circuit 220, record/play control circuit 222, data acquisition circuit 216, infra-red receiver 228, and sound adapter 250. Output device 252 is coupled to sound adapter 250. Video processor 218 is coupled to data acquisition circuit 216 to provide a data pulse (DP) signal and a clock pulse (CP) signal. Data acquisition circuit 216 is bidirectionally coupled to page memory 214.

Figure 4:
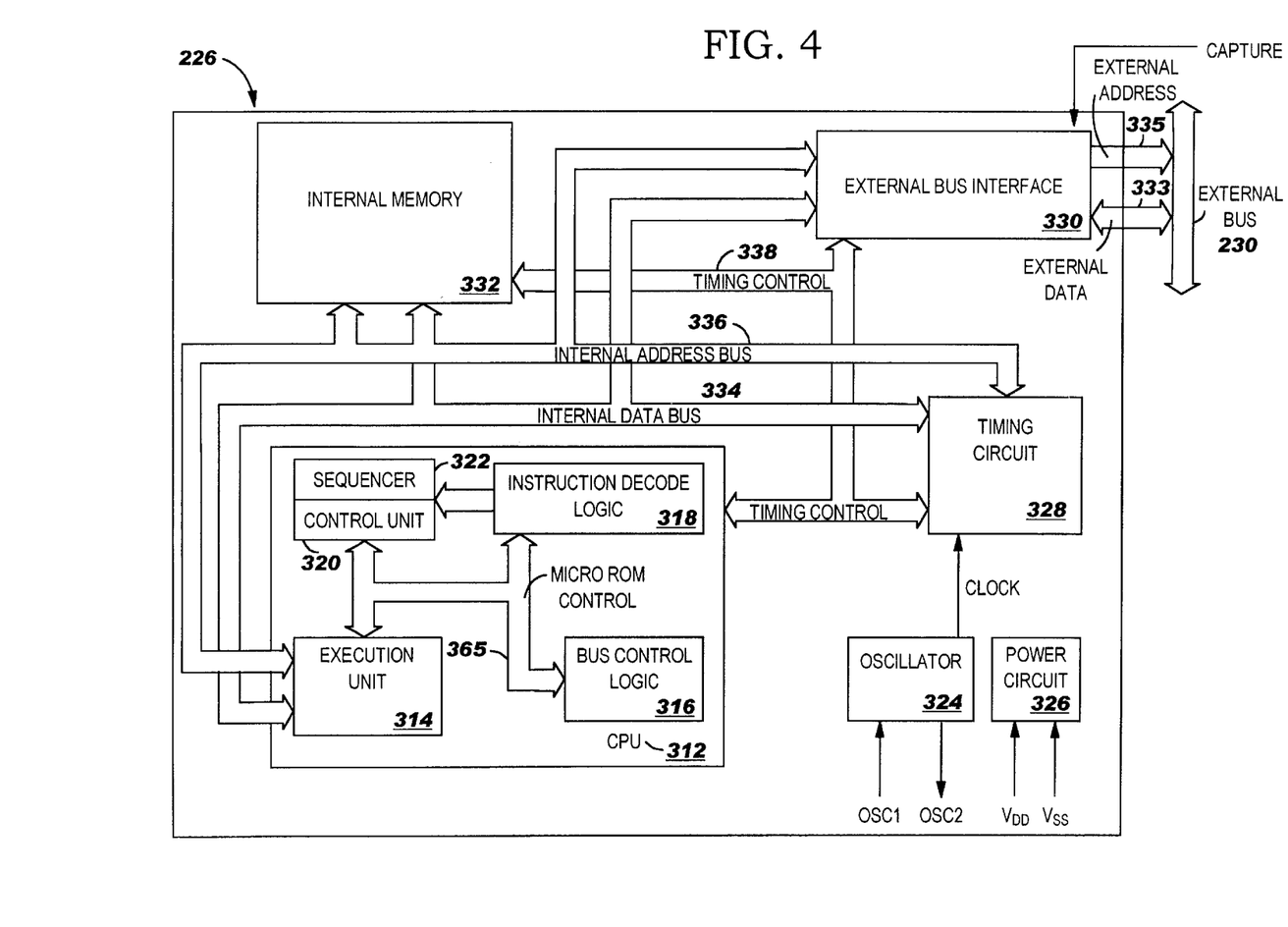
FIG. 4 illustrates, in block diagram form, a microcontroller implemented in accordance with the receiver of FIG. 2.

FIG. 4 illustrates microcontroller 226 in greater detail. Microcontroller 226 comprises a CPU 312, an oscillator 324, a power circuit 326, a timing circuit 328, an external bus interface 330, and an internal memory 332. CPU 312 comprises an execution unit 314, a bus control logic circuit 316, an instruction decode logic 318, a control unit 320, and a sequencer 322.

During operation, an "OSC 1" signal is provided to oscillator 324 via an external source, such as a crystal. The crystal may be connected between the OSC 1 and OSC 2 signals to enable the crystal to oscillate. The OSC 1 signal provides a "Clock" signal to a remaining portion of microcontroller 226. Operation of a crystal oscillator is well-known in the data processing art and should be apparent to one with ordinary skill in that art.

Similarly, power circuit 326 receives both a "Vdd" and a "Vss" signal from an external power source. The Vdd signal provides a positive 5 volts and the Vss signal provides a reference, or ground voltage. The Vdd and Vss signals are provided to each of the remaining components of microcontroller 226. The routing of these signals is well-known in the data processing art and, therefore, will not be described in greater detail herein.

Timing circuit 328 receives the Clock signal and subsequently provides appropriate timing signals to each of CPU 312, external bus interface 330, and internal memory 322 via a timing control bus 338.

A plurality of address values are provided from external bus interface 330 via an External Address bus 335. Similarly, a plurality of data values are communicated to external bus interface 330 via an External Data bus 333. External bus interface 330 functions to communicate address and data values between microcontroller 226 and an external user or device. External bus interface 330 provides a plurality of address and data values to a remaining portion of microcontroller 226 via an internal address bus 336 and an internal data bus 334, respectively. Internal memory 332 stores information values necessary for the proper operation of microcontroller 226. Additionally, other data values may be stored therein if specified in a user program via Internal Address bus 336 and Internal Data bus 334.

Within CPU 312, instruction decode logic circuit 318 is coupled to control unit 320 and sequencer 322. A micro-ROM control bus 365 couples instruction decode logic circuit 318, control unit 320, sequencer 322, execution unit 314, and bus control logic circuit 316 to one another.

Description of Operation

Refer now to FIGS. 1 and 2. It should be noted that in the following description, FIGS. 1 and 2 perform substantially the same functions. The communication network configuration illustrated in FIG. 2 implement receivers within each of video cassette recorder 2106 and television 2108. In contrast, the communication system of FIG. 1 illustrates a separate receiver external to video cassette recorder 106 and television 108. While such configurations are different, it should be noted that each configuration performs similar functions. Therefore, while the following description describes operation of the communication system illustrated in FIG. 1, the description of operation could easily be applied to the communication system illustrated in FIG. 2 by making minor modifications of operation well-known to those with skill in the data processing art.

With communication network 100 of FIG. 1 and communication network 200 of FIG. 2, a viewer may instantly and impulsively decide to view, purchase, or record a future segment or program with the press of a single button. Such instant decisions may take place when the viewer observes a non-disruptive or transparent icon on a display device at the same time the viewer observes a preview of a program or program segment that is interesting. The presence of the icon on the screen indicates that related data is present in teletext data stream.

Additionally, the communication network of the present invention requires no special separate programming channel or screen and no cursor to be manipulated during the programming operations. Furthermore, the icons may be presented to the viewer during normal programs, as well as during the commonly used previews before or after commercials. Additionally, there is no need to download and store a programming guide ahead of time in the communication network of the present invention. Each of the functions implemented by the communication network 100 of the present invention will subsequently be described in greater detail.

During operation, programming source 102 will provide a transmitted signal to receiver 104. The transmitted signal comprises graphics and data information transferred in accordance with the teletext protocol. Specifically, information indicating that an icon should be generated for a particular segment, as well as channel information, date information, and time information, are transmitted using the teletext protocol. The icon may be in the normal video signal, in addition or instead of in the teletext data stream. The use of the teletext protocol to transmit data other than or in addition to the text spoken by the characters being displayed is well-known to those with skill in the data processing art and, therefore, will not be described in greater detail herein. For information regarding implementation of a transmission system that inserts data in a teletext data stream is disclosed in U.S. Pat. No. 5,552,833, which is hereby incorporated by reference herein.

The transmitted signal is subsequently provided to receiver 104. Receiver 104 detects the encoded information within the transmitted signal. This information is used to display an icon on a screen of a television 108 or another display device during a preview of the desired television program or segment. Upon viewing this icon, the viewer of television 108 or another display device may selectively enable television 108, video-cassette recorder 106, a cable box (not illustrated herein), or another display device to transfer control information enabling receiver 104 to store information regarding a channel source, date, and time of the program or program segment desired to be viewed by the viewer. The teletext data may include time and date information that could then be used to set the clock in the display device correctly. It should be noted that in alternate embodiments of the present invention, receiver 104 may be implemented within television 108 or video-cassette recorder 106 (see FIG. 2). Those skilled in the data processing art will readily recognize that such a receiver may be integrated within communication media for displaying and providing information to an external user.

Receiver 104 is illustrated in greater detail in FIG. 3. As illustrated in FIG. 3, the transmitted signal is provided by programming source 102 in a normal video mode which also provides teletext to tuner 202. In one embodiment of the present invention, the transmitted signal is provided to an aerial input for receiving UHF television signals from a transmitting station, such as programming source 102 of FIG. 1. The received television signals are applied to tuner circuit 202, which is tunable to different television channels by a tuning control circuit 220. The output signal from tuner circuit 202 is provided to filter/demodulator 204. Filter/demodulator 204 outputs a composite video signal that is applied to video record/play control circuit 206 and to teletext decoder 212. Operation of video record/play control circuit 206 is controlled by record/play control circuit 222. The operation of tuning control circuit 220 and video record/play control circuit 206 is determined by microcontroller 226 over External bus 230. Note that record/play control 222 and video record/play control circuit 206 are not necessary in devices which do not record, such as a television-only device. An infra-red receiver 228 then transmits user select signals to microcontroller 226. Memory 224 stores programming and control data for the various record and play functions of receiver 104 of the present invention.

During operation, video record/play record circuit 206 produces a composite video (CV) signal. The CV signal is provided to modulator 208. Modulator 208 subsequently re-establishes the television signal at an appropriate amplitude and period and outputs the television signal to provide the appropriate images and display information to the viewer.

Teletext decoder 212 comprises video processor 218, data acquisition circuit 216, and page memory 214. Video processor 218 receives the composite video signal, CV, from filter/demodulator 204 and produces data pulses (DP) and clock pulses (CP) from the teletext data included in the CV signal. The data pulses related to required teletext pages are selectively acquired by data acquisition circuit 216 and are subsequently stored within page memory 214 in one embodiment of the present invention. When stored data is read from teletext decoder 212 for subsequent use, the data is in the form of RGB (red green blue) signals which are color coded by encoder 210 to compose a composite video (CV) signal emulating all or part of a CV signal. The teletext typically only covers part of the video screen. The CV signal is then applied to modulator 208 to re-establish a television signal for a teletext display page.

While the foregoing has provided a general description of operation of the teletext decoder, a more detailed description of use of the teletext decoder within the communication system of the present invention will subsequently be provided.

During operation, assume that programming source 102 transmits a television signal to the receiver of the present invention. As outlined above, the Transmitted signal is provided in tuner 202, where it is identified as corresponding to a specific television station. The Transmitted signal is subsequently filtered and demodulated in circuit 204 to produce the composite video, CV, signal.

The CV signal is then provided to teletext decoder 212. Within teletext decoder 212, video processor 218 receives and processes the CV signal to obtain data pulses and clock pulses from the teletext data included within the CV signal. These data and clock pulses could have been programmed by the programming source to display an icon at a certain point in time. Alternatively, the icon could be included in the normal video signal. This would cause all viewers to see the icon, even if their television could not utilize the icon. Specifically, the icon is displayed to indicate that a television viewer may press a single button to program a video-cassette recorder, cable box, television or other similar device to access a specific television program or segment of a program at a certain time. Thus, together with the data and clock signals necessary to display the icon, the teletext data will provide source (or channel) information, date information, and time information corresponding to the program or programming segment identified by the icon.

To display the icon, the data pulses and clock pulses provided by video processor 218 are transferred to data acquisition circuit 216, where they are converted into RGB (red, green, blue) signals for display on a television. In the alternative, it should be noted that data acquisition circuit 216 may be implemented to provide output signals for any display device that provides visual displays or any audio device that provides sound signals.

The programming source could also include sound data in the teletext data. In such an operation, microprocessor 226 receives sound data from the teletext decoder 212 and utilizes the sound data to control a sound adapter 250 via bus 230. Sound adapter 250 then drives an output device 252, such as a speaker or a beeper. Alternatively, microprocessor 226 could drive a beeper or other output device directly.

Encoder 210 receives the RGB signals and provides them to video record/play record circuit 206 and modulator 208. As previously mentioned, video record/play circuit 206 provides data typically transferred in a television signal using modulator 208. Modulator 208 combines the normal video and teletext signals to produce a television signal that is transferred to a television, a video-cassette recorder, a cable box, or another form of a display device or storage device for the communication media. Thus, the control and data information necessary to render the icon on a television screen during presentation of a preview for a program segment or a television program is decoded by teletext decoder 212 and subsequently displayed together with a television signal being displayed at an appropriate point in time.

In addition to providing the icon to be displayed on a display device or communication media, data acquisition circuit 216 provides control information to microcontroller 226 via External bus 230. This control information indicates when the icon is being displayed on the display device or communication device. Microcontroller 226 polls infra-red receiver 228 for the assertion of a Capture signal from remote control 110 when the icon is being displayed on the display device or communication device. The Capture signal is provided to external bus 230 of microcontroller 226 by infra-red receiver 228.

Subsequently, external bus interface 330 decodes the Capture signal, together with external address and external data received via External bus 230 to provide a plurality of Address, Data, and Timing Control signals. It should be noted that the address signals are provided to CPU 312 via internal address bus 336 and the data signals are provided via Internal-Data bus 334. CPU 312 provides the timing control signals to the timing circuit 328 via Timing Control bus 338. When the Capture signal is-asserted, timing circuit 328 is then able to store timing information about the date and start time of the program or program segment desired to be viewed in the future. Furthermore, the source of the television program that is desired to be viewed at a future point in time is provided to CPU 312 of microcontroller 226. Within CPU 312, the control information is evaluated by execution unit 314 and stored within an appropriate memory location of internal memory 332 under control of CPU 312. Thus, internal memory 332 will store the source of the desired television program, together with other data and control values that may be useful in selectively programming a device for receipt of a future program.

Subsequently, timing circuit 328 compares a current date and time with previously stored date and times values. The previously stored date and time values correspond to a television program or program segment that has previously been identified for recording or viewing by a user when a specified icon was displayed on a display device. When the actual date and time match the target programmed time and date stored within timing circuit 328, timing circuit 328 provides a timing control signal to CPU 312. Additionally, timing circuit 328 provides data and/or address information to CPU 312 to indicate that a display or recording operation should be executed.

Figure 6:
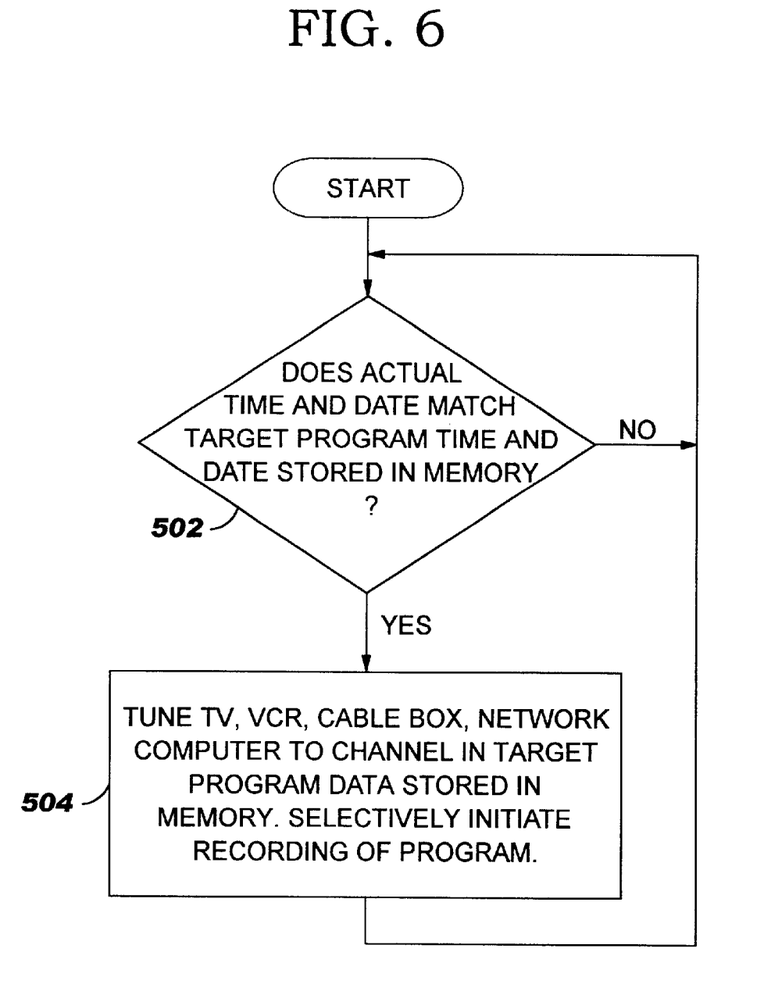
FIG. 6 illustrates, in flow diagram form, a second portion of a methodology implemented in accordance with one embodiment of the present invention.

Alternatively, the timing function could be performed entirely by a program internal to the microprocessor. This flow chart is illustrated in FIG. 6.

In response to the control signals, as well as, the address and data signals provided thereto, CPU 312 accesses the program data, including a source of the television programmer segment, from internal memory 332. CPU 312 subsequently provides control, data, and address information to tuning control circuit 220 via External bus 230. Tuning control circuit 220 provides a tuner control signal to tuner 202 to enable tuner 202 to receive the desired transmitted television signal. Additionally, CPU 312 of microcontroller 226 selectively generates the appropriate control, address, and data signals to be provided to record/play control circuit 222. Record/play control circuit 222 evaluates each of the control, data, and address signals provided thereto to generate the appropriate control signals required to enable video record/play record circuit 206 to generate the control signals for-providing a desired-television program or program segment.

For example, if a user desires to record a specified segment of a television program that was identified with an icon during a preview, the user may indicate that the program segment should be recorded by pushing a button on a user-controlled hand-held module (remote control unit) or a device that performs a similar selection function. In response, infra-red receiver 228 generates a Capture signal that enables microcontroller 226 to capture data corresponding to the icon and television program therein. At the desired point in time, microcontroller 226 generates data, address, and control signals required to control operation of a video-cassette recorder in one embodiment of the present invention. Subsequently, the control signal generated by microcontroller 226 enables tuning control circuit 220 to tune tuner 202 to a desired source. These signals may be provided within the teletext encoded television signal transmitted by the receiver or may be generated internally within the video-cassette recorder through the implementation of a receiver within the video-cassette recorder.

Similarly, a user may desire that the television be automatically tuned to a source of the desired program or programming segment at an appropriate point time. Microcontroller 226 may also be utilized to generate these control signals to enable automatic tuning of a television or another display device. The use of a microcontroller to perform such tuning operations and program control operations is well-known to those with skill in the art and, therefore, will not be described in detail herein.

Additionally, it should be noted that the control signals may be enabled to initiate recordation or storing of digital data from data provided into the teletext encoded portion of the signals. Such digital data may include programs, games, recipes, phone numbers, home shopper item details, and the like.

Figure 5:
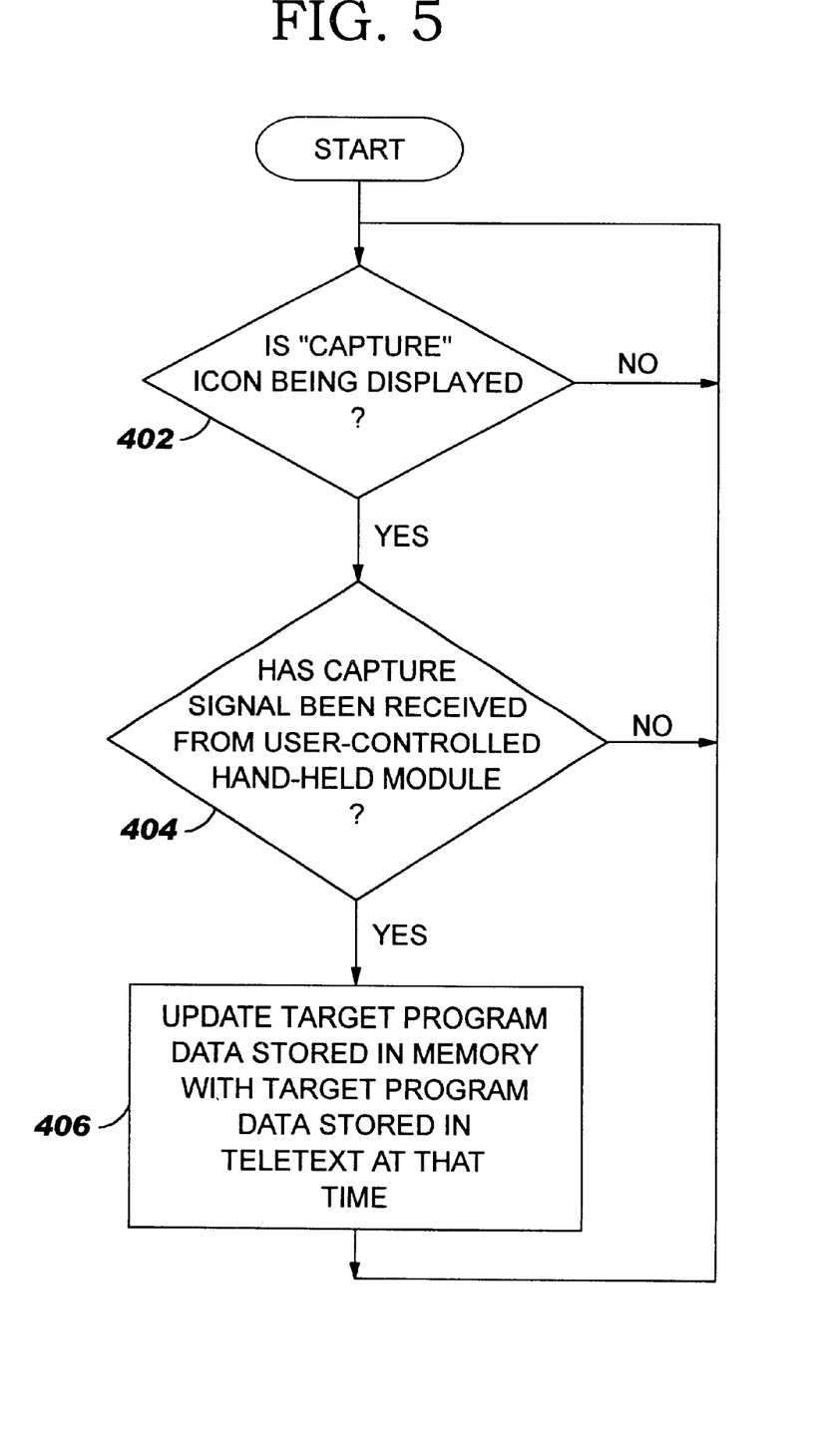
FIG. 5 illustrates, in flow diagram form, a first portion of a methodology implemented in accordance with one embodiment of the present invention.

FIGS. 4 and 5 illustrate flowcharts that provide an overview of operation of the present invention. Refer now to FIG. 4. In a step 402, microcontroller 226 first determines whether the "capture" icon is being displayed on a display device or through another communication device. If not, a program flow returns to step 402. Subsequently, step 404 determines whether the capture signal has been received from the user-controlled hand-held module, such as a remote control unit. Microcontroller 226, together with infra-red receiver 228, executes step 404. If the capture signal has not been received, a program flow returns to step 402. However, if the capture signal has been- received, microcontroller 226 updates the target program data stored therein or in a memory device with target program data contained in the teletext message received from teletext decoder 212 at the time the capture signal is received from the user-controlled hand-held module.

Next, refer to FIG. 5. In a step 502, microcontroller 226 or timing circuit 328 determines whether the actual time and date match the target program time and date stored in a memory. If not, a program flow returns to step 502. However, if the time and date match the target program time and date, the television, video-cassette recorder, cable box, network computer, or other display device, are tuned to the channel corresponding to the target program data stored in memory of CPU 312. Additionally, CPU 312 selectively initiates recording of a program.

The foregoing illustrates both a general and more detailed description of one implementation of the present invention. In summary, the present invention implements a video source that places an icon on a communication device during the preview of a television program or segment of a television program. The icon indicates to the user that a single button on a remote control or other user-controlled device can be used to program the communication device, including televisions, video-cassette recorders, cable boxes, or network computers, to display or record the desired program or program segment as the program segment is being televised or communicated. Specifically, during operation of the present invention, the exact date, time, and source of the actual television program or program segment is encoded in an unused portion of a teletext data stream when the icon is present. Subsequently, when the communication device (television, video-cassette recorder, cable box, or network computer, among others) receives an appropriate command from its user-controlled device, a microcontroller within that communication device, saves the information together with a channel presently being viewed. Furthermore, the communication device includes an "alarm clock" type function such as that typically used by video-cassette recorders. When the actual date and time match that of the desired segment, the communication device will tune itself to the desired channel or video source. In one embodiment of the present invention, the video-cassette recorder would begin recording. Alternatively, the television, video-cassette recorder, cable box or other form of communication device may notify the viewer that a desired segment is about to start and the viewer can elect to change channels to view that segment. It should be noted that this notification may be made in a way that is not disruptive to the video presently being watched,. such as with an icon or message at the bottom of the screen.

In one embodiment of the present invention, the icon that indicates a previously selected program segment is starting could be generated by the television, network computer, and the like. In one embodiment, this icon could be in the form of an "picture-in-a-picture". (Note that this icon is different than the programming source generated icon that is used during the preview of a segment.) The image in the picture-in-a-picture could be one or more frames of the previously selected video program. Furthermore, it could actually be moving video if desired. The programming source could setup the preview's teletext data to cause the title image of the desired segment to be captured by the picture-in-a-picture. This would inform the viewer that a previously selected segment was being transmitted and would allow the viewer to make a more informed decision about whether to stop watching a current program and view the previously selected program.

It should be noted that the description provided herein is but one example of an implementation of the present invention. It should be noted that many additional implementations may also be utilized to realize the present invention. For example, multiple programs and program segments can be programmed using the methodology of the present invention. Stated another way, the methodology of the present invention is not limited to programming just a single segment. Additionally, the encoded data could also include a description of the program or program segment, in addition to the previously described teletext data. If such a description were utilized, the communication device could include a method for viewing and/or editing the list of desired programs and program segments. Additionally, this notification could be in the form of a small "picture in a picture" that "pops" up on the display at an appropriate time. The contents of the target segment would then be illustrated in the "picture in a picture."

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A method of operating a communication system comprising the steps of:
broadcasting a first program content and first program data, said first program data generated whenever a portion of said first program content references a second program content;
receiving said first program content and said first program data and displaying said first program content concurrent with an observable first indicator, said observable first indicator generated in response to a decode of said first program data;

issuing a select command by a user receiving said first program content in response to a presence of said observable first indicator;

storing said first program data in response to said select command;

receiving second program data; and comparing first selected data within said stored first program data to second selected data within said second program data, wherein said first selected data comprises a specified broadcast time and date and a corresponding broadcast frequency for said second program content.

2. The method of claim 1, further comprising the steps of:

displaying a second indicator corresponding to said second program content in response to a compare of said first selected data to said second program data;

issuing an accept command by said user in response to a presence of said second indicator;

selecting said second program content for reception in response to said accept command; and displaying said second program content to said user.

3. The method of claim 2, wherein said accept command is issued by activating a remote control for a receiver, said receiver configured to receive said second program content.

4. The method of claim 1, further comprising the steps of:

selecting said second program content for reception in response to a compare of said first selected data to said second selected data; and displaying said second program content to said user in response to said compare of said first selected data to said second selected data.

5. The method of claim 1, further comprising the steps of:

selecting said second program content for reception in response to a compare of said first selected data to said second selected data; and recording said second program content in response to said compare of said first selected data to said second selected data.

6. The method of claim 1, further comprising the steps of:

displaying a second indicator corresponding to said second program content in response to a compare of said first selected data to said second selected data;

issuing an accept command by said user in response to a presence of said second indicator;

selecting said second program content for reception in response to said accept command; and recording said second program content.

7. The method of claim 1, wherein said first and second program content comprise audio and video content.

8. The method of claim 1, wherein said portion of said first program content referencing said second program content is an audio reference.

9. The method of claim 1, wherein said portion of said first program content referencing said second program content is a video reference.

10. The method of claim 1, wherein said portion of said first program content referencing said second program content is a text reference.

11. A method of operating a communication system comprising the steps of:

broadcasting a first program content and first program data, said first program data generated whenever a portion of said first program content references a second program content;

receiving said first program content and said first program data and displaying said first program content concurrent with an observable first indicator, said observable first indicator generated in response to a decode of said first program data;

issuing a select command by a user receiving said first program content in response to a presence of said observable first indicator;

storing said first program data in response to said select command;

receiving second program data; and comparing first selected data within said stored first program data to second selected data within said second program data, wherein said second program content is a part of said first program content and is to be broadcast at a specified broadcast time and date after said first program content.

12. The method of claim 1, wherein said observable first indicator is a video indicator.

13. The method of claim 1, wherein said select command is issued concurrent with said observable first indicator.

14. The method of claim 1, wherein said select command is issued by activating a remote control for a receiver, said receiver configured to receive said first program content and said first program data.

15. A method of operating a communication system comprising the steps of:

broadcasting a first program content and first program data, said first program data generated whenever a portion of said first program content references a second program content;

receiving said first program content and said first program data and displaying said first program content concurrent with an observable first indicator, said observable first indicator generated in response to a decode of said first program data;

issuing a select command by a user receiving said first program content in response to a presence of said observable first indicator;

storing said first program data in response to said select command;

receiving second program data; and comparing first selected data within said stored first program data to second selected data within said second program data, wherein said second selected data is a time and date from a current time and date clock.

16. A communication system comprising:

a transmitter for broadcasting a first program content and first program data, said first program data generated whenever a portion of said first program content references a second program content;

a receiver for receiving said first program content and said first program data and displaying said first program content concurrent with an observable first indicator generated in response to a decode of said first program data;

a command circuit for issuing a select command by a user receiving said first program content in response to a presence of said observable first indicator;

a storage unit for storing said first program data in response to said select command;

a receive circuit for receiving second program data; and a compare circuit for comparing first selected data within said stored first program data to second selected data within said second program data, wherein said first selected data comprises a specified broadcast time and date and a corresponding broadcast frequency for said second program content.

17. The communication system of claim 16 further comprising:

a display circuit for displaying a second indicator corresponding to said second program content in response to a compare of said first selected data to said second selected data;

a circuit for issuing an accept command by said user in response to a presence of said second indicator;

a select circuit for selecting said second program content for reception in response to said accept command; and a display circuit for displaying said second program content to said user.

18. The communication system of claim 17, wherein said accept command is issued by activating a remote control for a receiver, said receiver configured to receive said second program content.

19. The communication system of claim 16 further comprising:

a select circuit for selecting said second program content for reception in response to a compare of said first selected data to said second selected data; and a display unit for displaying said second program content to said user in response to said compare of said first selected data to said second selected data.

20. The communication system of claim 16 further comprising:

a select circuit for selecting said second program content for reception in response to a compare of said first selected data to said second selected data; and a recording unit for recording said second program content in response to said compare of said first selected data to said second selected data.

21. The communication system of claim 16 further comprising:

a display circuit for displaying a second indicator corresponding to said second program content in response to a compare of said first selected data to said second selected data;

a circuit for issuing an accept command by said user in response to a presence of said second indicator;

a select circuit for selecting said second program content for reception in response to a said accept command; and a recording unit for recording said second program content.

22. The communication system of claim 16, wherein said first and second program content comprises audio and video content.

23. The communication system of claim 16, wherein said portion of said first program content referencing said second program content is an audio reference.

24. The communication system of claim 16, wherein said portion of said first program content referencing said second program content is a video reference.

25. The communication system of claim 16, wherein said portion of said first program content referencing said second program content is a text reference.

26. The communication system of claim 16, wherein said observable first indicator is a video indicator.

27. The communication system of claim 16, wherein said select command is issued concurrent with said observable first indicator.

28. The communication system of claim 16, wherein said select command is issued by activating a remote control for a receiver, said receiver configured to receive said first program content and said first program data.

29. A communication system comprising:

a transmitter for broadcasting a first program content and first program data, said first program data generated whenever a portion of said first program content references a second program content;

a receiver for receiving said first program content and said first program data and displaying said first program content concurrent with an observable first indicator generated in response to a decode of said first program data;

a command circuit for issuing a select command by a user receiving said first program content in response to a presence of said observable first indicator;

a storage unit for storing said first program data in response to said select command;

a receive circuit for receiving second program data; and a compare circuit for comparing first selected data within said stored first program data to second selected data within said second program data, wherein said second program content is a part of said first program content and said second program content is to be broadcast at a specified broadcast time and date after said first program content.

30. A communication system comprising:

a transmitter for broadcasting a first program content and first program data, said first program data generated whenever a portion of said first program content references a second program content;

a receiver for receiving said first program content and said first program data and displaying said first program content concurrent with an observable first indicator generated in response to a decode of said first program data;

a command circuit for issuing a select command by a user receiving said first program content in response to a presence of said observable first indicator;

a storage unit for storing said first program data in response to said select command;

a receive circuit for receiving second program data; and a compare circuit for comparing first selected data within said stored first program data to second selected data within said second program data, wherein said second selected date is a time and date from a current time and date clock.

* * * * *